(12) United States Patent
Chung et al.

(10) Patent No.: US 6,736,401 B2
(45) Date of Patent: May 18, 2004

(54) LAMINATED FINGER SEAL WITH CERAMIC COMPOSITION

(75) Inventors: Vincent Chung, Tempe, AZ (US);
Arun Kumar, Chandler, AZ (US);
Bjoern Schenk, Phoenix, AZ (US);
Adrian R. Allan, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 35 days.

(21) Appl. No.: 10/027,573

(22) Filed: Dec. 19, 2001

(65) Prior Publication Data

US 2003/0111797 A1 Jun. 19, 2003

(51) Int. Cl.[7] ................................................. F01D 11/02
(52) U.S. Cl. ........................................ 277/355; 277/548
(58) Field of Search ................................. 277/416, 417, 277/355, 503, 543, 548

(56) References Cited

U.S. PATENT DOCUMENTS

| | | | |
|---|---|---|---|
| 2,233,579 A | | 3/1941 | Bowers |
| 3,460,842 A | | 8/1969 | Pointer et al. |
| 3,744,805 A | | 7/1973 | Heinrich |
| 4,042,248 A | * | 8/1977 | Williamitis ................. 277/555 |
| RE30,206 E | | 2/1980 | Ferguson et al. |
| 4,202,554 A | | 5/1980 | Snell |
| 4,358,120 A | | 11/1982 | Moore |
| 4,415,317 A | | 11/1983 | Butterworth |
| 4,600,202 A | | 7/1986 | Schaeffler et al. |
| 4,678,113 A | | 7/1987 | Bridges et al. |
| 4,696,480 A | | 9/1987 | Jörnhagen |
| 4,770,424 A | | 9/1988 | Otto |
| 4,781,530 A | | 11/1988 | Lauterbach et al. |
| 4,940,080 A | | 7/1990 | Reeves et al. |
| 5,031,922 A | | 7/1991 | Heydrich |
| 5,042,823 A | | 8/1991 | Mackay et al. |
| 5,071,138 A | * | 12/1991 | Mackay et al. ............. 277/303 |
| 5,108,116 A | | 4/1992 | Johnson et al. |
| 5,630,590 A | * | 5/1997 | Bouchard et al. ........... 277/301 |
| 5,755,445 A | | 5/1998 | Arora |
| 5,884,918 A | * | 3/1999 | Basu et al. .................. 277/355 |
| 6,267,381 B1 | * | 7/2001 | Wright ......................... 277/355 |
| 6,325,380 B1 | * | 12/2001 | Feigl et al. .................. 277/352 |
| 6,502,823 B1 | * | 1/2003 | Turnquist et al. ........... 277/355 |

FOREIGN PATENT DOCUMENTS

| | | |
|---|---|---|
| DE | 626651 | 2/1936 |
| GB | 2021209 A | 5/1979 |

* cited by examiner

Primary Examiner—William L. Miller
(74) Attorney, Agent, or Firm—Robert Desmond, Esq.

(57) ABSTRACT

A ceramic finger seal for use between a housing and a combustor liner to inhibit air passage therebetween and for use in fluid sealing between a rotating shaft and a housing circumscribing the rotating shaft. The ceramic finger seal has at least two annular diaphragm members constructed of two or more diaphragm segments bonded end to end by ceramic cement or other high temperature joining compounds. The diaphragm members may be partitioned into a generally continuous inner diameter portion and a segmented outer diameter portion or the reverse thereof. The segmented portion includes finger elements spaced uniformly apart forming gaps therebetween and extend radially outward or inward terminating in a foot portion. The rolled edge on the finger is formed by laser cutting to prevent gouging of the combustor liner surface.

16 Claims, 6 Drawing Sheets

LAMINATED FINGER SEAL WITH CERAMIC COMPOSITION

GOVERNMENT RIGHTS

This invention was made with Government support under Contract No. N00421-97-C-1049 awarded by the U.S. Navy, BAA High Temperature Rise Combustor Program. The Government has certain rights in this invention.

BACKGROUND OF THE INVENTION

This invention relates to sealing devices disposed relative to two generally stationary structures of approximately cylindrical shape as well as to other objects such as two relatively rotating members requiring a fluid seal therebetween. The present invention may provide for air sealing of ceramic combustor liners that typically have large temperature excursions as well as excessive surface temperature that may exceed the temperature capability of metallic sealing devices and that may experience deflection relative to the adjacent structure. The device also may be used to provide fluid sealing between a rotating shaft and a housing circumscribing the rotating shaft.

The present art uses a series of interlocking ceramic segments disposed around a combustor liner for sealing. The ceramic segments may be biased against the combustor by metallic springs or fingers. This seal structure provides air-to-air sealing between the two elements while allowing axial and radial relative motions between the bodies. Seals that use a spring loading feature in other sealing applications may be as disclosed in U.S. Pat. No. 4,415,317; however, they are expensive to manufacture, subject to premature failure of individual spring elements and are complex to install in the application.

Use of ceramic materials for seals has been hypothesized for brush type seals in U.S. Pat. No. 4,600,202. This patent discloses a brush type seal between machine components in relative motion, of which at least one member rotates, in which strands or bristles consist of composite fibers designed for good thermal conductivity in at least portions of their surface and at least a portion has flexible, elastic properties. The disclosure indicates the bristles can be made from various types of glass, glass-metals, glass-ceramics, or a combination thereof. However, this proposed type of bristle seal with ceramic content flexible enough to perform as a seal and not fracture in use has been found to be difficult to manufacture and to have low reliability in application.

Laminated finger seals are known in the art as exemplified by U.S. Pat. No. 5,108,116. These seals are designed for fluid sealing between relatively rotating elements as for example a shaft and a housing. As a result of this application, the fingers, which may have a foot element, are designed to slide on the shaft element when rotating. The finger portion provides pressure through the foot portion to maintain contact with the rotating shaft. A balance must be maintained to avoid excessive wear of the foot portion and the rotating shaft. There exist various improvements in designs for the foot portion, as for example to give it aerodynamic properties to glide over the surface of the shaft. In such an application a considerable amount of pressure can be exerted by the finger elements to maintain a tight seal interface and aerodynamic or sliding motion at low friction levels is not required. However, the use of a ceramic composition as in the instant invention includes a ceramic finger seal that can withstand the excessive heat generation caused by the friction between the seal and the rotating shaft.

For the combustion liner type interface sealing application, the combustor liner in operation may be at an elevated temperature relative to the surrounding structure. A finger seal inserted therebetween may have the finger elements extended radial outward for engagement with the combustor liner. The inner circumference of the seal may then be attached to the housing. Use of ceramic composition finger seals allows application of such combustion liner seals to be used in very high temperature environment. For combustion liner applications the ceramic composition finger seals may be fabricated with the finger elements oriented radial inward for sealing the outer most portion of the combustor.

As can be seen, there is a need for a generally circular sealing device for air and fluid sealing between two bodies experiencing relative radial or axial motion and elevated temperatures.

SUMMARY OF THE INVENTION

In one aspect of the present invention, a set of laminated ceramic finger seal may be inserted between two generally stationary structures to inhibit airflow therebetween. The seal may have multiple diaphragm segments and diaphragm members laminated together and fixed in a holding device. The diaphragm members may be circumferential bands having a generally continuous inside diameter portion and a segmented outside diameter portion or a reverse orientation thereof and may be designated as inside diameter and outside diameter seals.

The segmented portion defines a circumferentially uniform array of finger elements spaced apart to define a plurality of uniform gaps. When the seal is clamped in the holding device attached to the housing and assembled into the combustor the finger elements are deflected toward the inner circumference of the ceramic finger seal thereby applying pressure against the combustor liner wall to affect the sealing between the structures. For use in sealing the outermost portion of the combustor the finger elements are deflected toward the outer circumference of the ceramic finger seal.

With relative rotating elements the circumferential bands may have a general continuous outside diameter portion and a segmented inside diameter portion. The finger elements with a foot portion contact the rotatable shaft to apply pressure to effect the sealing between the structures.

In another aspect of the present invention, the uniform gaps of the diaphragm members may have a stress reducing keyhole formed at the terminal end thereof. The diaphragm members may be laminated together with a high temperature joining compound and disposed between a pair of spacers with the combination clamped between a pair of endplates.

In a further aspect of the present invention, the finger elements have a foot portion at an outermost end for sealing engagement with a combustor liner or a rotating shaft.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
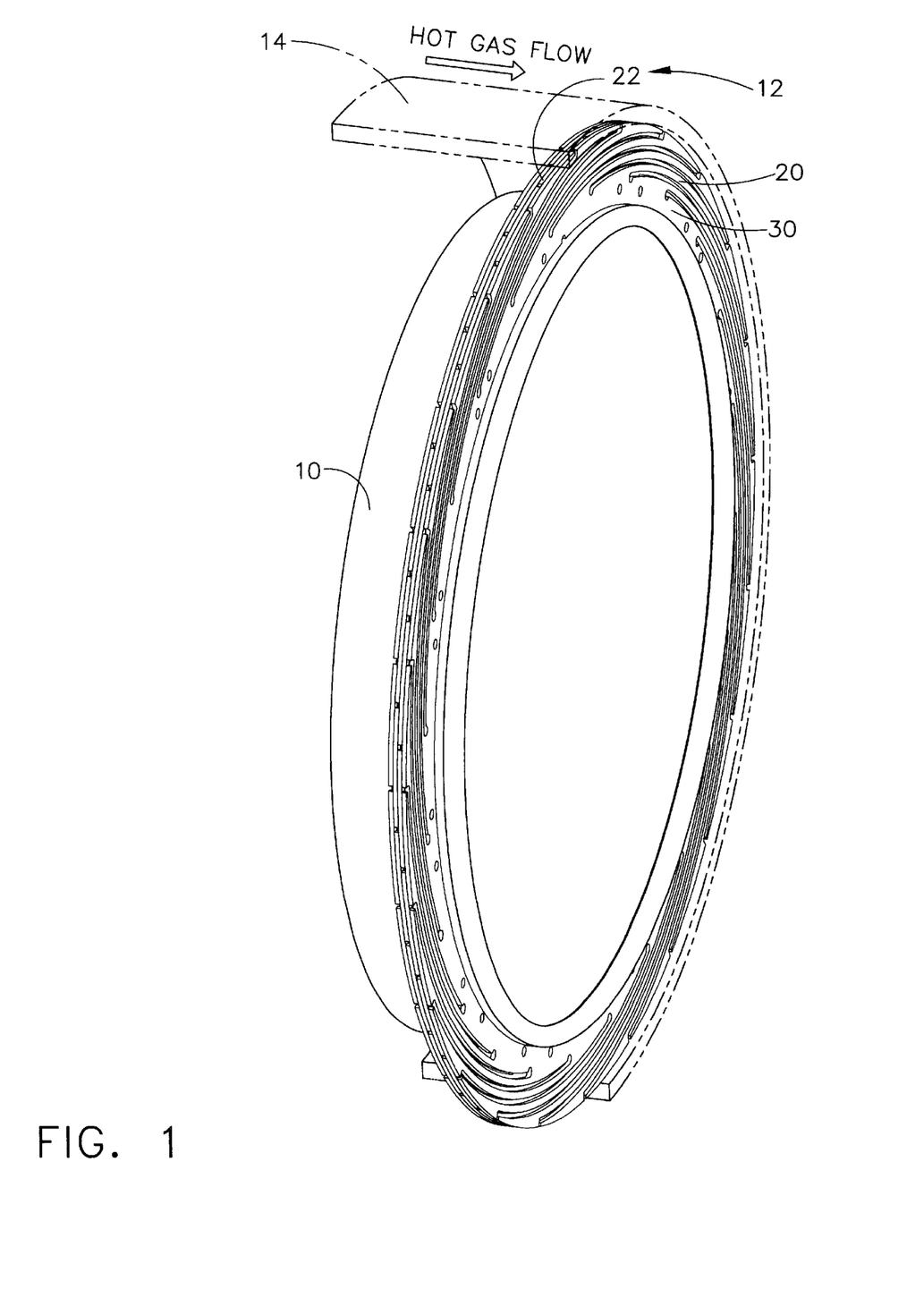
FIG. 1 illustrates a partial perspective view of an inside diameter liner with inside diameter ceramic finger seal installed according to the present invention.
Figure 1A:
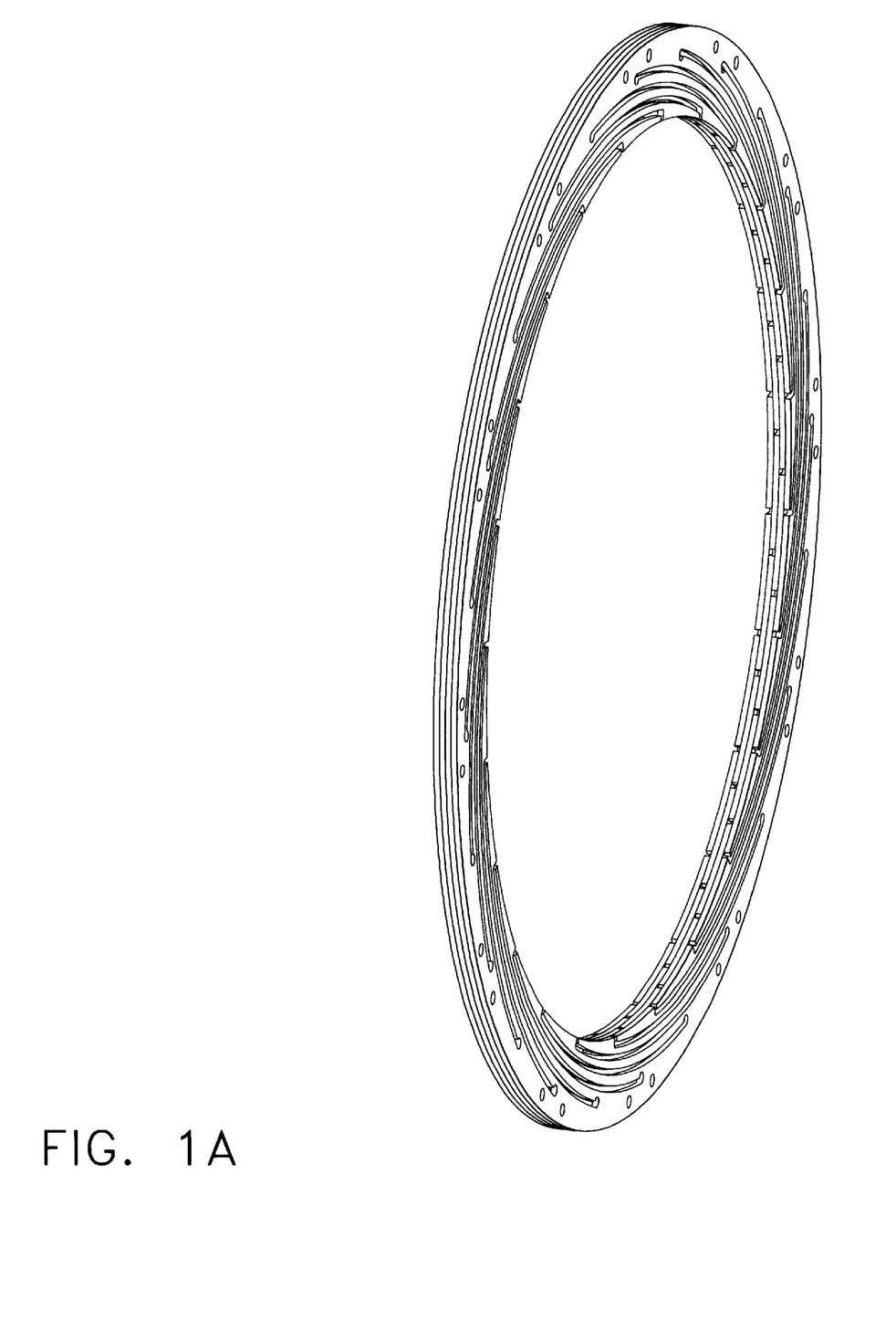
FIG. 1a illustrates a partial perspective view of an outside diameter liner with outside diameter ceramic finger seal installed according to the present invention.

Referring to FIG. 1, use of an inside diameter ceramic seal 20 for sealing against an inside diameter combustor liner 14 adjacent to a turbine nozzle (not shown) discloses an embodiment of the invention. The ceramic finger seal 20 may be disposed circumferentially about and attached to a housing 10. The outer circumference 22 of the seal 20 may then engage the wall of combustor liner 14. The seal 20 serves to inhibit leakage of air into the turbine nozzle, downstream of the combustor liners. While an embodiment for use in sealing a combustor is presented, the use of a ceramic finger seal in a structure such as disclosed in U.S. Pat. No. 5,108,116, hereby incorporated by reference, for relative rotating bodies may also be used. In such case, the ceramic finger seal would also have a foot portion and a keyhole as disclosed herein for fluid sealing performance and stress reduction.

Figure 2:
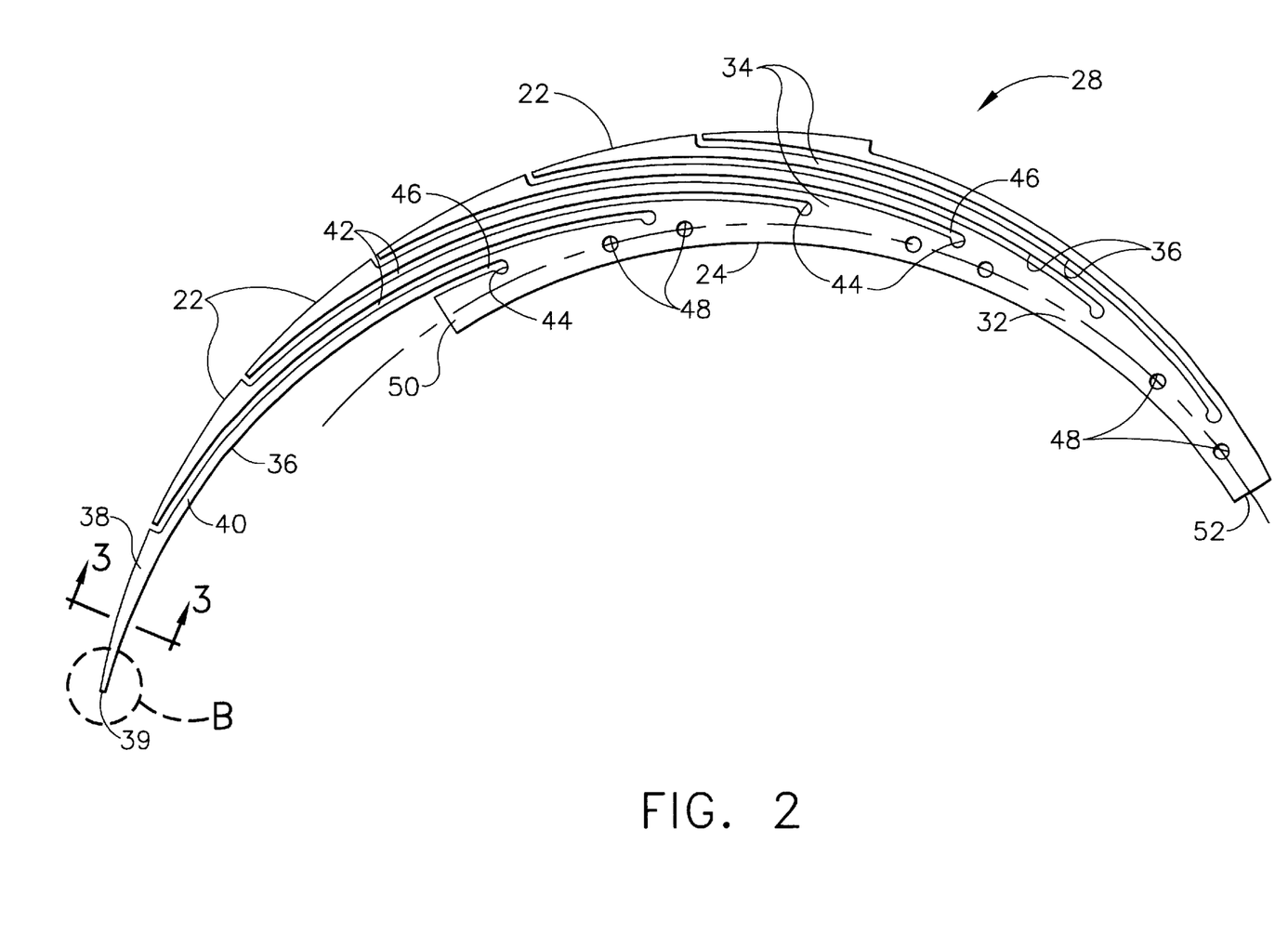
FIG. 2 illustrates a view of a diaphragm segment of the present invention.
Figure 3:
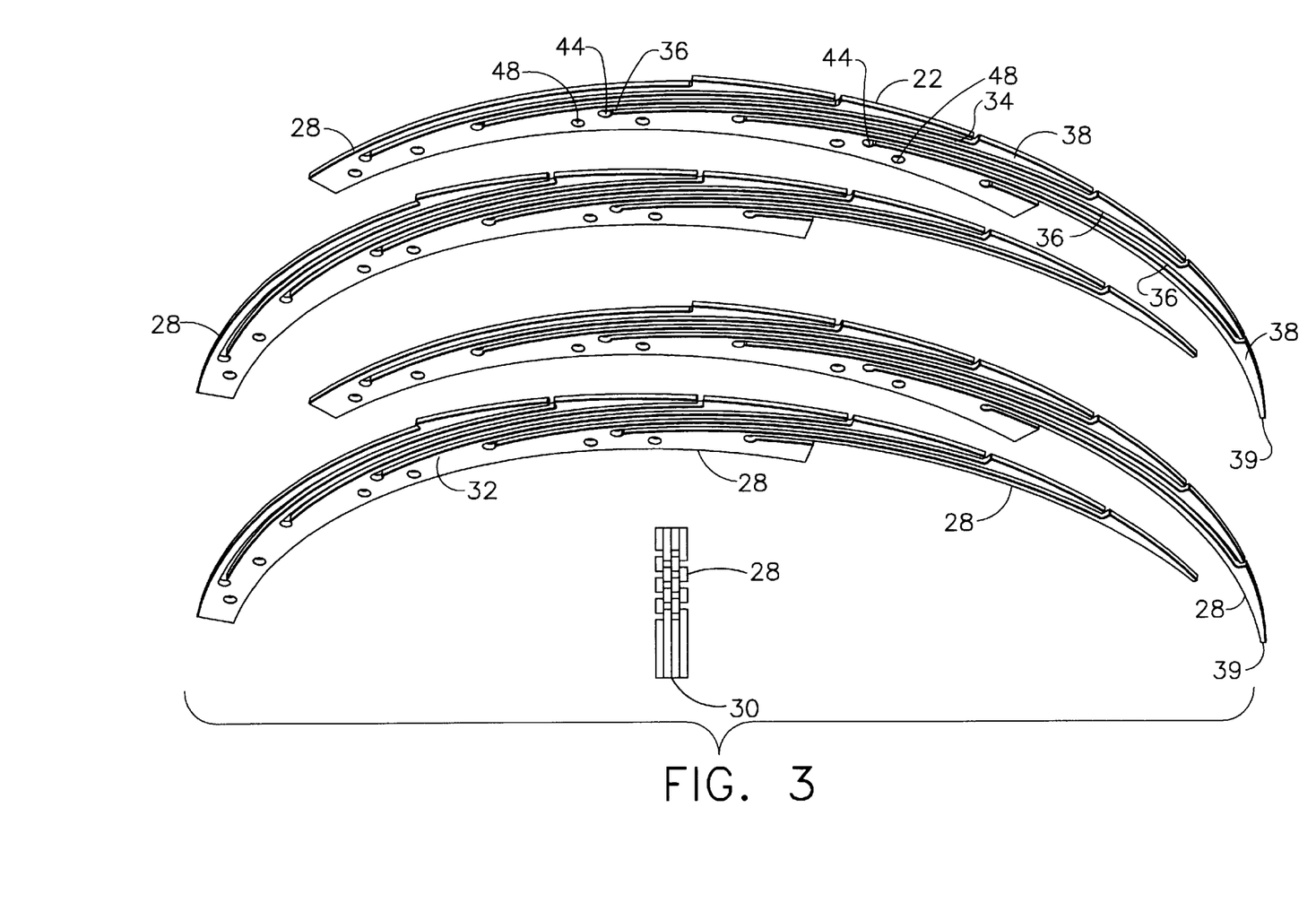
FIG. 3 illustrates a perspective view of a plurality of diaphragm segments with adjacent segments offset for assembly according to the present invention.
Figure 3A:
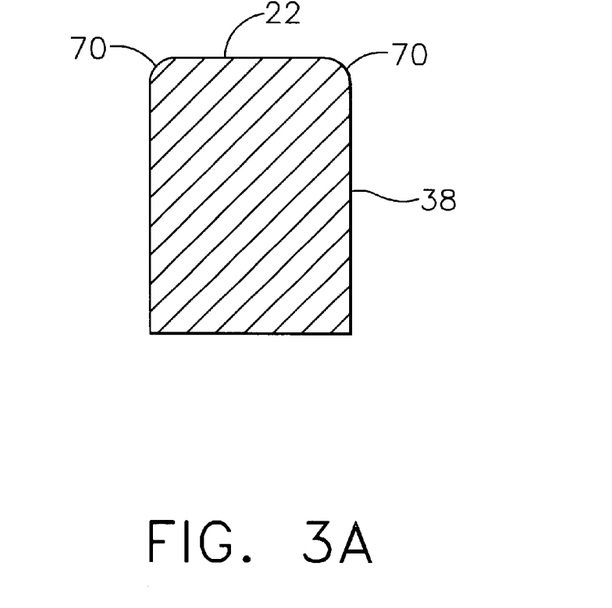
FIG. 3a illustrates a cross-sectional view of a finger seal taken along line 3—3 of FIG. 3.
Figure 3B:
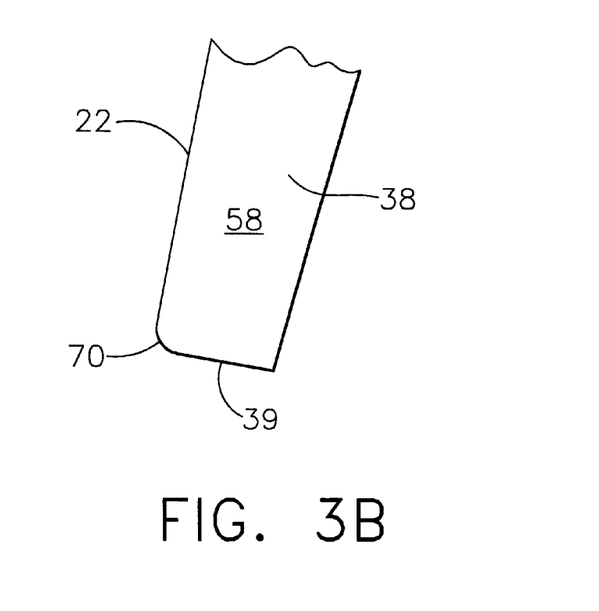
FIG. 3b illustrates a close-up view of a finger element of a finger seal taken at circle B of FIG. 3.

Referring to FIGS. 1 through 5, the ceramic seal 20 may be comprised of a plurality of diaphragm members 30 or thin annular ceramic bands laminated together and retained between spacers 50. The diaphragm members 30 have a generally continuous inner diameter portion 32 and a segmented outer diameter portion 34 having relatively flexible finger elements 36 extending radially outward from an inner relatively rigid portion. The spacers 50, resembling washers, when clamped with the diaphragm members 30 between endplates 60 prevent the segmented outer diameter portion 34 from being axially pinched by directing the clamping load through the radially inner diameter portion 32. End plates 60 provide structure for engagement with a holding device such as a clamp mechanism 64 shown in FIG. 5. Depending on the particular application the end plates 60 may not be necessary. The use of the ceramic finger seal type configuration in a non-rotational sealing application allows for a tight air seal with flexibility for radial motion of a housing and combustor liner as compared to prior art use of blades or wire sealing methods. In a rotational application the ceramic finger elements 36 and foot portions 38 thereof allow for use in high temperature environments such as approximately 2200 degrees F. which may be caused by rotational friction forces as well as other factors. In addition, the stress relief keyhole 44 located at the terminal end of the gaps 42 formed between the flexible finger elements 36, as illustrated in FIGS. 2 and 3, increases the useful life of the ceramic seal 20.

Referring to FIGS. 1 through 3b, the ceramic finger seal 20 may be comprised of a plurality of diaphragm segments 28. The diaphragm member 30 may be segmented to increase the yield in manufacturing when using ceramic materials and to minimize handling and shipping damages. Increase yield in manufacturing is a result of using low cost process such as high shear roll compaction. As illustrated, the diaphragm segments 28 represent one quarter of the circumference of a diaphragm member 30 to complete a circular seal element. While quarter section elements are illustrated other segment proportioning may be used. The diaphragm segments 28 may be bonded end to end with a first end 50 mating to a second end 52 and attached by ceramic cement or other high temperature joining compounds wherein four diaphragm segments 28 form a diaphragm member 30. Use of ceramic cement or other high temperature joining compounds in a bonding process is known in the ceramic manufacture art. Examples of ceramic materials suitable for ceramic seals 20 include but are not limit to silicon nitride, silicon carbine, aluminum oxide and zirconia. Such materials have a temperature capability of up to and exceeding 2200° F. A commercial example of a silicon nitride is "Honeywell AS 800" ceramic. These example ceramic materials have a low fracture toughness relative to metal and therefore use of the bonding process without riveting enables the ceramic finger seal to be used in this environment.

One example of a manufacturing technique may be to form the diaphragm segment 28 using thin sheets, between 0.020 inches and 0.040 inches thick, of "Honeywell AS 800" silicon nitride formed from a high shear roll compaction process. The sheets may be thermally processed through binder burnout and sintering. The dense sheets may then be surface ground to the desired thickness that may be 0.020 inch to 0.040 inch. The ceramic seal 20 finger and hole patterns as described herein may then be laser cut from the thin sheet material. The use of laser cutting may cause a rounding 70 of edges 39 on the finger elements or foot portion 38 that may reduce gouging or scaring of a sealing surface.

In structure, the outer diameter portion 34 may be comprised of finger elements 36 extending radially outward from the inner diameter portion 32 and having a foot portion 38 at their radially outermost end 40 cooperatively defining an outer diameter. The form of the finger elements is generally a comb-like structure as with other finger seal devices known to those skilled in the art. The finger elements 36 may be spaced apart by gaps 42 in a uniform manner with the finger elements 36 and inner diameter portion having about the same thickness. The finger elements 36 extend radially outward and the foot portion 38 outer circumferential 22 surface (base portion of foot portion 38) requires no provision for contact with a rotating surface. Rounding 70 may be formed where side portions 58 meet outer circumferential 22 surface.

In addition the diaphragm segment 28 and thereby the assembled diaphragm member 30 has a keyhole 44 formed at the terminus end 46 of gaps 42 for stress relief of the finger elements 36 by increasing the relative small diameter terminal end of gaps 42 allowing additional dispersion of stress force to the inner diameter portion 32 and to minimize crack initiation.

The finger and gap structure of the seal 20 facilitate sealing contact with a surface such as that of inside diameter combustor liner 14. When inserting the housing 10 and attached inside diameter ceramic seal 20, a slight rotation of the seal in a counter clockwise direction as viewed in FIG. 1 allows firm seating of the outer circumference foot portion 38. The foot portion 38 outer face is pressed against the inside diameter combustor liner 14 inner wall as the finger elements 36 are deflected radially inward. The rotation of the ceramic seal 20 in a counter clockwise direction utilizes the generally clockwise orientation of the finger elements 36, as best viewed in FIG. 1, to facilitate deflection and seating of the finger elements 36.

In use, there generally is no relative motion between the housing 10 and liner 14 in a rotational direction, the ceramic seal 20 may be seated such that the finger elements 36 engage the liner 14 using the desired pressure or force to achieve the required air-to-air sealing between structures. Therefore, within the deflection stress limits of the ceramic material structure of the finger elements 36 and the desired relative deflection extremes between the housing 10 and combustor liner 14, the ceramic seal 20 may be seated between the bodies to minimize air leakage.

There normally may be relative radial and axial motion between the housing 10 and liner 14 due to temperature differential caused expansion and contraction as well as structure vibration motion. Such movement may be accommodated by the finger elements 36 of the ceramic seal 20. A diaphragm member 30 constructed of ceramic material as discussed above provides suitable air flow sealing in this application. As can be appreciated, the flexibility of the finger elements 36 allows deflection between the structures by compression and extension of finger elements in the direction of an applied force such as a vibration.

Figure 4:
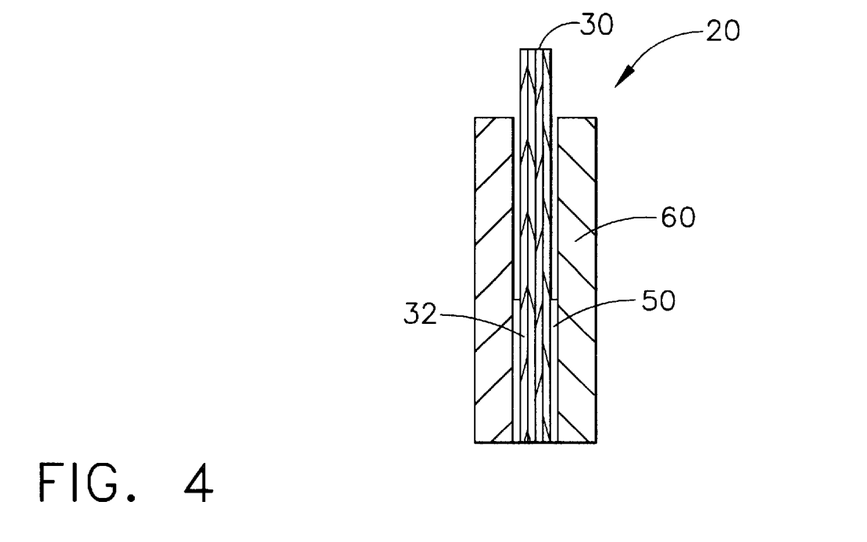
FIG. 4 illustrates a cross-sectional view of an assembled finger seal of the present invention.
Figure 5:
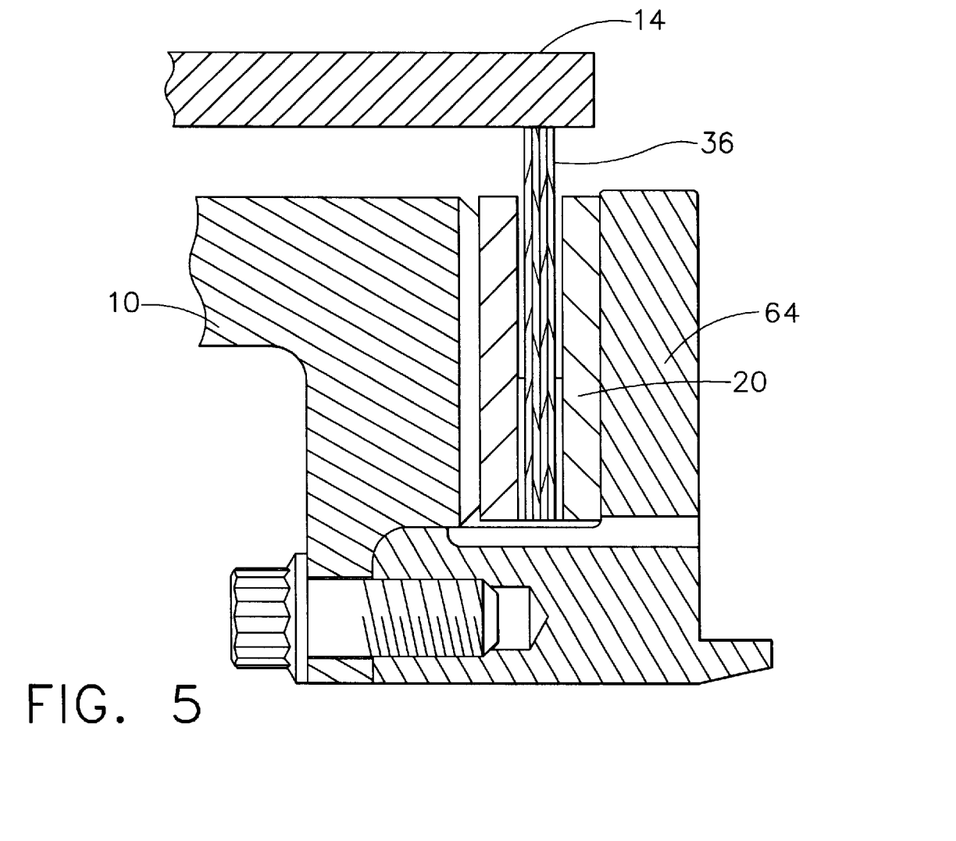
FIG. 5 illustrates a partial view of a housing and inside diameter combustor liner with inside diameter finger seal contained therebetween according to the present invention.

Referring to FIGS. 4 and 5 the ceramic seal may be an assembly of a plurality of diaphragm members 30, spacers 58 and endplates 60. The diaphragm members 30 may be laminated together in quantities of 2 or more depending on the sealing requirements. The laminates may be bonded along the inner diameter portion 32 of the diaphragm members 30 thereby allowing freedom of motion of the finger elements 36. This bonding may be by use of ceramic cement or other high temperature joining compounds to form a stack of diaphragm members 30. The diaphragm members 30 are assembled side by side with adjacent laminates offset or positioned such that the fingers of one block the gaps of the other. The diaphragm members 30 may have pairs of apertures 48, as illustrated in FIG. 3, to allow offset of adjacent members.

The laminated diaphragm members 30 may be disposed between spacers 50 and a pair of endplates 60 for attachment to the housing 10. The ceramic seal 20 may then be attached circumferentially around the housing 10 with a clamping mechanism 64, as illustrated in FIG. 5. Thus the inner diameter portion 32 of each diaphragm member 30 may be fixedly restrained and the outer diameter portion 34 rests in flexible contact with the liner 14. The use of the ceramic seal 20 in such static applications may allow for low stress levels because of the low deflection due to a similar coefficient of thermal expansion between a ceramic combustor and the ceramic seal 20.

It should be understood, of course, that the foregoing relates to preferred embodiments of the invention and that modifications may be made without departing from the spirit and scope of the invention as set forth in the following claims.

We claim:

1. A ceramic seal for sealing between two structures that may experience relative radial and axial motion comprising:

a plurality of annular ceramic diaphragm members having an inner diameter portion and an outer diameter portion wherein said inner diameter portion is generally continuous and said outer diameter portion is segmented;

said outer diameter portion having a plurality of radially extending finger elements defining an outer circumference and generally uniformly spaced apart having a gap formed therebetween;

sealing engagement with a structure, said foot portion having a base which said finger elements having a foot portion at an outermost end for forms an outside circumference of said seal and side portions extending from said foot portion;

said finger elements having a rolled edge where said base meets at least one of said side portions, thereby reducing gouging or scoring of a sealing surface while providing a reduced surface area of contact between said base and said sealing surface that is less than an original surface area of contact of a seal without said rolled edge;

said ceramic diaphragm members laminated together and fastened along said inner diameter portion wherein adjacent ceramic diaphragm members are oriented such that said finger elements of one ceramic diaphragm member block said gaps of a second ceramic diaphragm member; and said ceramic diaphragm members disposed between a pair of spacers fixidly attached for attachment to a structure.

2. The ceramic seal as in claim 1 wherein said outer diameter portion having at a terminus end of said gaps a keyhole formed therein to reduce stress caused by flexure of said finger elements.

3. The ceramic seal as in claim 1 wherein said ceramic annular diaphragm members are comprised of a plurality of diaphragm segments attached end to end by a high temperature joining compound.

4. The ceramic seal as in claim 1 wherein said ceramic diaphragm members and said spacers are fixedly attached between a pair of end plates for attachment to said structure.

5. The ceramic seal as in claim 4 wherein said ceramic diaphragm members, said spacers and said end plates are clamped to a housing for positioning of the seal adjacent a turbine combustor exit nozzle and said finger elements engage a combustor liner.

6. The ceramic seal as in claim 4 wherein said ceramic diaphragm members, said spacers and said end plates are clamped to a rotatable shaft and said finger elements engage a shaft housing.

7. A ceramic seal for sealing between two structures that may experience relative radial and axial motion comprising:

a plurality of annular ceramic diaphragm members having an inner diameter portion and an outer diameter portion wherein said inner diameter portion is segmented and said outer diameter portion is generally continuous;

said inner diameter portion having a plurality of radially extending finger elements defining an inner circumference and generally uniformly spaced apart having a gap formed therebetween;

said finger elements having a foot portion at an innermost end for sealing engagement with a structure, said foot portion having a base which forms an inside circumference of said seal and side portions extending from said foot portion;

said finger elements having a rolled edge where said base meets at least one of said side portions, thereby reducing gouging or scoring of a sealing surface while providing a reduced surface area of contact between said base and said sealing surface that is less than an original surface area of contact of a seal without said rolled edge;

said ceramic diaphragm members laminated together and fastened along said outer diameter portion wherein adjacent ceramic diaphragm members are oriented such that said finger elements of one ceramic diaphragm member block said gaps of a second ceramic diaphragm member; and said ceramic diaphragm members disposed between a pair of spacers fixedly attached for attachment to a structure.

8. The ceramic seal as in claim 7 wherein said inner diameter portion having at a terminus end of said gaps a keyhole formed therein to reduce stress caused by flexure of said finger elements.

9. The ceramic seal as in claim 7 wherein said ceramic annular diaphragm members are comprised of a plurality of diaphragm segments attached end to end by a high temperature joining compound.

10. The ceramic seal as in claim 7 wherein said ceramic diaphragm members and said spacers are fixedly attached between a pair of end plates for attachment to said structure.

11. The ceramic seal as in claim 10 wherein said ceramic diaphragm members, said spacers and said end plates are clamped to a housing for positioning of the seal adjacent a combustor exit nozzle and said finger elements engage a combustor liner.

12. The ceramic seal as in claim 10 wherein said ceramic diaphragm members, said spacers and said end plates are clamped to a shaft housing and said finger elements engage a rotatable shaft.

13. A ceramic seal for air sealing between a housing and a combustor liner comprising:

a plurality of annular ceramic diaphragm members having an inner diameter portion and an outer diameter portion wherein said inner diameter portion is generally continuous and said outer diameter portion is segmented;

said outer diameter portion having a plurality of radially extending finger elements defining an outer circumference, wherein said finger elements having a foot portion at an outermost end for sealing engagement with a combustor liner, and generally uniformly spaced apart having a gap formed therebetween wherein said outer diameter portion having at a terminus end of said gaps a keyhole formed therein said foot portion having a base which forms an outside circumference of said seal and side portions extending from said foot portion;

said finger elements having a rolled edge where said base meets at least one of said side portions, thereby reducing gouging or scoring of a sealing surface while providing a reduced surface area of contact between said base and said sealing surface that is less than an original surface area of contact of a seal without said rolled edge;

said ceramic diaphragm members laminated together and fastened along said inner diameter portion wherein adjacent ceramic diaphragm members are oriented such that said finger elements of one ceramic diaphragm member block said gaps of a second ceramic diaphragm member; and said ceramic diaphragm members disposed between a pair of spacers and the combination fixidly attached between a pair of end plates for attachment to a housing.

14. The seals as in claim 13 wherein said ceramic diaphragm members, said spacers and said end plates are clamped to the housing for positioning the ceramic seal adjacent a combustor exit nozzle and said finger elements engage a combustor liner.

15. A ceramic seal for fluid sealing between a housing and a rotatable shaft comprising:

a plurality of annular ceramic diaphragm members having an inner diameter portion and an outer diameter portion wherein said inner diameter portion is segmented and said outer diameter portion is generally continuous;

said inner diameter portion having a plurality of radially extending finger elements defining an inner circumference, wherein said finger elements having a foot portion at an outermost end for sealing engagement with a rotatable shaft, and generally uniformly spaced apart having a gap formed therebetween wherein said inner diameter portion having at a terminus end of said gaps a keyhole formed therein;

said foot portion having a base which forms an outside circumference of said seal and side portions extending from said foot portion;

said ceramic diaphragm members laminated together and fastened along said outer diameter portion wherein adjacent ceramic diaphragm members are oriented such that said finger elements of one ceramic diaphragm member block said gaps of a second ceramic diaphragm member; and said finger elements having a rolled edge where said base meets at least one of said side portions, thereby reducing gouging or scoring of a sealing surface while providing a reduced surface area of contact between said base and said sealing surface that is less than an original surface area of contact of a seal without said rolled edge;

said ceramic diaphragm members disposed between a pair of spacers and the combination fixedly attached between a pair of end plates for attachment to a housing.

16. The seal as in claim 15 wherein said ceramic diaphragm members, said spacers and said end plates are clamped to the housing and said finger elements engage a rotatable shaft.

* * * * *